United States Patent
Deng et al.

(10) Patent No.: US 12,515,611 B2
(45) Date of Patent: Jan. 6, 2026

(54) MANIFOLD TO SELECTIVELY INFLATE AIRBAGS

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 18/587,099

(22) Filed: Feb. 26, 2024

(65) Prior Publication Data
US 2025/0269817 A1   Aug. 28, 2025

(51) Int. Cl.
*B60R 21/261* (2011.01)
*B60R 21/207* (2006.01)
*B60R 21/26* (2011.01)

(52) U.S. Cl.
CPC .......... *B60R 21/261* (2013.01); *B60R 21/207* (2013.01); *B60R 2021/26094* (2013.01); *B60R 2021/2615* (2013.01)

(58) Field of Classification Search
CPC ........ B60R 21/207; B60R 2021/26094; B60R 2021/2615
See application file for complete search history.

(56) References Cited

U.S. PATENT DOCUMENTS

| | | | | |
|---|---|---|---|---|
| 5,842,718 A * | 12/1998 | Byon | ................ | B60R 21/01508 280/736 |
| 7,677,598 B1 | 3/2010 | Ryan et al. | | |
| 11,161,473 B2 | 11/2021 | Deng et al. | | |
| 11,267,427 B1 | 3/2022 | Deng et al. | | |
| 11,433,848 B1 * | 9/2022 | Faruque | ................ | B60R 21/264 |
| 11,479,200 B1 | 10/2022 | Gao et al. | | |
| 11,807,166 B2 | 11/2023 | Deng et al. | | |

(Continued)

FOREIGN PATENT DOCUMENTS

| | | | | |
|---|---|---|---|---|
| DE | 102022115610 A1 * | 12/2022 | ............. | B60R 21/20 |
| JP | 2008201298 A | 9/2008 | | |
| KR | 20070039775 A | 4/2007 | | |

OTHER PUBLICATIONS

DE102022115610A1 Machine English Translation (Year: 2022).*

*Primary Examiner* — Jason D Shanske
*Assistant Examiner* — Matthew James O'Neill
(74) *Attorney, Agent, or Firm* — Frank A. MacKenzie; Brooks Kushman P.C.

(57) ABSTRACT

A vehicle includes a first seat and a first airbag supported by the first seat. The vehicle includes a second seat and a second airbag supported by the second seat. The vehicle includes a middle console disposed between the first seat and the second seat. The vehicle includes a manifold supported by the middle console. The manifold defines a chamber and including a first fluid outlet operatively coupled to the first airbag to provide fluid from the chamber to the first airbag and a second fluid outlet operatively coupled to the second airbag to provide fluid from the chamber to the second airbag. The vehicle includes an inflator supported by the middle console, the inflator operatively coupled to the manifold to provide fluid to the chamber.

19 Claims, 7 Drawing Sheets

(56) References Cited

U.S. PATENT DOCUMENTS

| | | | |
|---|---|---|---|
| 2009/0273168 A1* | 11/2009 | McCormick | B60R 21/26 |
| | | | 280/736 |
| 2016/0159307 A1* | 6/2016 | Fujiwara | B60R 21/013 |
| | | | 280/729 |
| 2017/0334386 A1 | 11/2017 | Park et al. | |
| 2017/0334390 A1 | 11/2017 | Song et al. | |
| 2019/0161045 A1* | 5/2019 | Thomas | B60R 21/2338 |
| 2021/0094499 A1 | 4/2021 | Deng et al. | |
| 2021/0101552 A1 | 4/2021 | Kim | |
| 2022/0073028 A1* | 3/2022 | Tamme | B60R 21/233 |

* cited by examiner

MANIFOLD TO SELECTIVELY INFLATE AIRBAGS

BACKGROUND

A vehicle may include one or more airbags deployable during certain vehicle impacts to control kinematics of occupants inside the vehicle during the impact. The airbag may be a component of an airbag assembly including a housing supporting the airbag, and an inflator in communication with the airbag for inflating the airbag from an uninflated position to an inflated position.

DETAILED DESCRIPTION

A vehicle includes a first seat and a first airbag supported by the first seat. The vehicle includes a second seat and a second airbag supported by the second seat. The vehicle includes a middle console disposed between the first seat and the second seat. The vehicle includes a manifold supported by the middle console. The manifold defines a chamber. The manifold includes a first fluid outlet. The first fluid outlet is operatively coupled to the first airbag to provide fluid from the chamber to the first airbag. The manifold includes a second fluid outlet. The second fluid outlet is operatively coupled to the second airbag to provide fluid from the chamber to the second airbag. The vehicle includes an inflator supported by the middle console. The inflator is operatively coupled to the manifold to provide fluid to the chamber.

The manifold may include an exhaust fluid outlet.

The vehicle may include an exhaust valve movable to an open position permitting fluid flow through the exhaust fluid outlet and to a closed position inhibiting fluid flow through the exhaust fluid outlet.

The vehicle may include a first valve movable to an open position permitting fluid flow through the first fluid outlet and to a closed position inhibiting fluid flow through the first fluid outlet, and a second valve movable to an open position permitting fluid flow through the second fluid outlet and to a closed position inhibiting fluid flow through the second fluid outlet.

The vehicle may include a computer having a processor and memory storing instructions executable by the processor to, in response to detecting a certain impact to the vehicle, command at least one of the first valve or the second valve from the closed position to the open position and command actuation of the inflator.

The instructions may include instructions to, after a threshold amount of time has lapsed from commanding the at least one of the first valve or the second valve from the closed position to the open position, command the at least one of the first valve or the second valve from the open positions to the closed positions.

The threshold amount of time may be 20 to 60 milliseconds.

The instructions may include instructions to command the exhaust valve from the closed position to the open position after a second threshold amount of time has lapsed from detecting the certain impact.

The second threshold amount of time may be at least two seconds.

The vehicle may include a third airbag supported by the middle console and a fourth airbag supported by the middle console, and the manifold may include a third fluid outlet operatively coupled to the third airbag to provide fluid from the chamber to the third airbag and a fourth fluid outlet operatively coupled to the fourth airbag to provide fluid from the chamber to the fourth airbag.

The first seat and the second seat may each include a seatback, the first airbag and the second airbag may be inflatable to inflated positions that extend forward from the seatbacks of the first seat and the second seat, and the third airbag and the fourth airbag may be inflatable to inflated positions that extend laterally outboard from the middle console in front of the first seat and the second seat.

The manifold may include an exhaust fluid outlet.

The vehicle may include an exhaust valve moveable to an open position permitting fluid flow through the exhaust fluid outlet and to a closed position inhibiting fluid flow through the exhaust fluid outlet.

The vehicle may include a first valve movable to an open position permitting fluid flow through the first fluid outlet and to a closed position inhibiting fluid flow through the first fluid outlet, a second valve movable to an open position permitting fluid flow through the second fluid outlet and to a closed position inhibiting fluid flow through the second fluid outlet, a third valve movable to an open position permitting fluid flow through the third fluid outlet and to a closed position inhibiting fluid flow through the third fluid outlet, and a fourth valve movable to an open position permitting fluid flow through the fourth fluid outlet and to a closed position inhibiting fluid flow through the fourth fluid outlet.

The vehicle may include a computer having a processor and memory storing instructions executable by the processor to, in response to detecting a certain impact to the vehicle, command at least one of the first valve, the second valve, the third valve, or the fourth valve from a closed position to an open position and command actuation of the inflator.

The instructions may include instructions to, in response to detecting another certain impact to the vehicle, command another of the at least one of the first valve, the second valve, the third valve, or the fourth valve from the closed position to the open position.

The instructions may include instructions to command the exhaust valve from the closed position to the open position after a threshold amount of time has lapsed from detecting the certain impact.

The threshold amount of time may be at least two seconds.

The chamber may define a first cross-sectional area, and the first fluid outlet may define a second cross-sectional area that is less than the first cross-sectional area.

With reference to the Figures, wherein like numerals indicate like parts throughout the several views, a vehicle 10 is shown. The vehicle 10 includes a first seat 12 and a first airbag 14 supported by the first seat 12. The vehicle 10 includes a second seat 16 and a second airbag 18 supported by the second seat 16. The vehicle 10 includes a middle console 20 disposed between the first seat 12 and the second seat 16. The vehicle 10 includes a manifold 22 supported by the middle console 20. The manifold 22 defines a chamber 24 and includes a first fluid outlet 26 operatively coupled to the first airbag 14 to provide fluid from the chamber 24 to the first airbag 14 and a second fluid outlet 28 operatively coupled to the second airbag 18 to provide fluid from the chamber 24 to the second airbag 18. The vehicle 10 includes an inflator 30 supported by the middle console 20. The inflator 30 is operatively coupled to the manifold 22 to provide fluid, such as inflation medium, to the chamber 24.

The manifold 22 may temporarily store inflation medium from the inflator 30 to provide increased control of inflation dynamics of the first airbag 14 and the second airbag 18, e.g., control of inflation timing and inflation pressure of the airbags 14, 18. The manifold 22 may store the inflation medium for a sufficient amount of time to enable inflation of, e.g., the first airbag 14 in response to a certain impact to the vehicle 10, and then after lapse of time, inflation of the second airbag 18 in response to detecting a certain subsequent impact to the vehicle 10.

Figure 1:
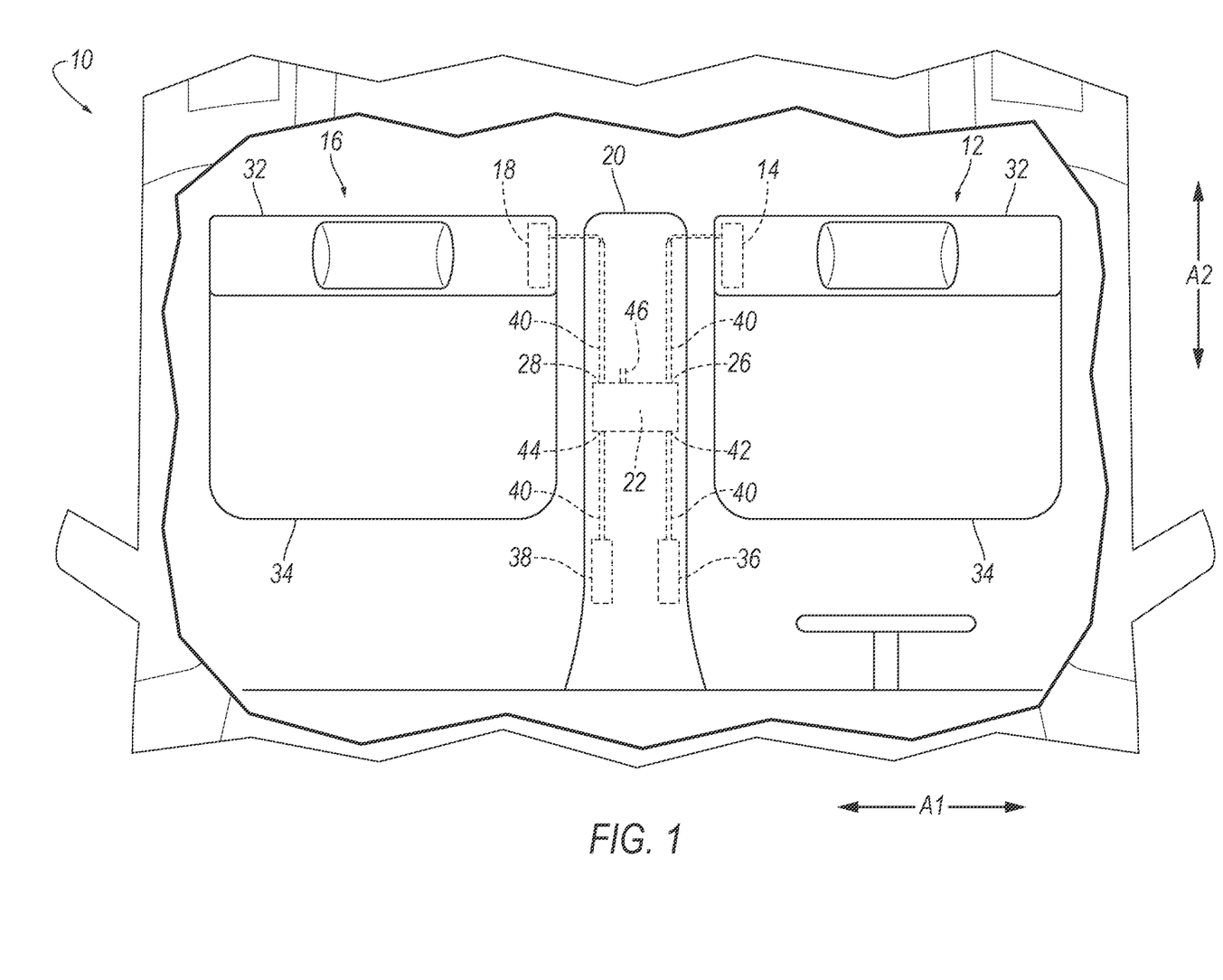
FIG. 1 is a top view of a portion of a vehicle broken away to show a passenger cabin with a manifold and airbags at uninflated positions.
Figure 2:
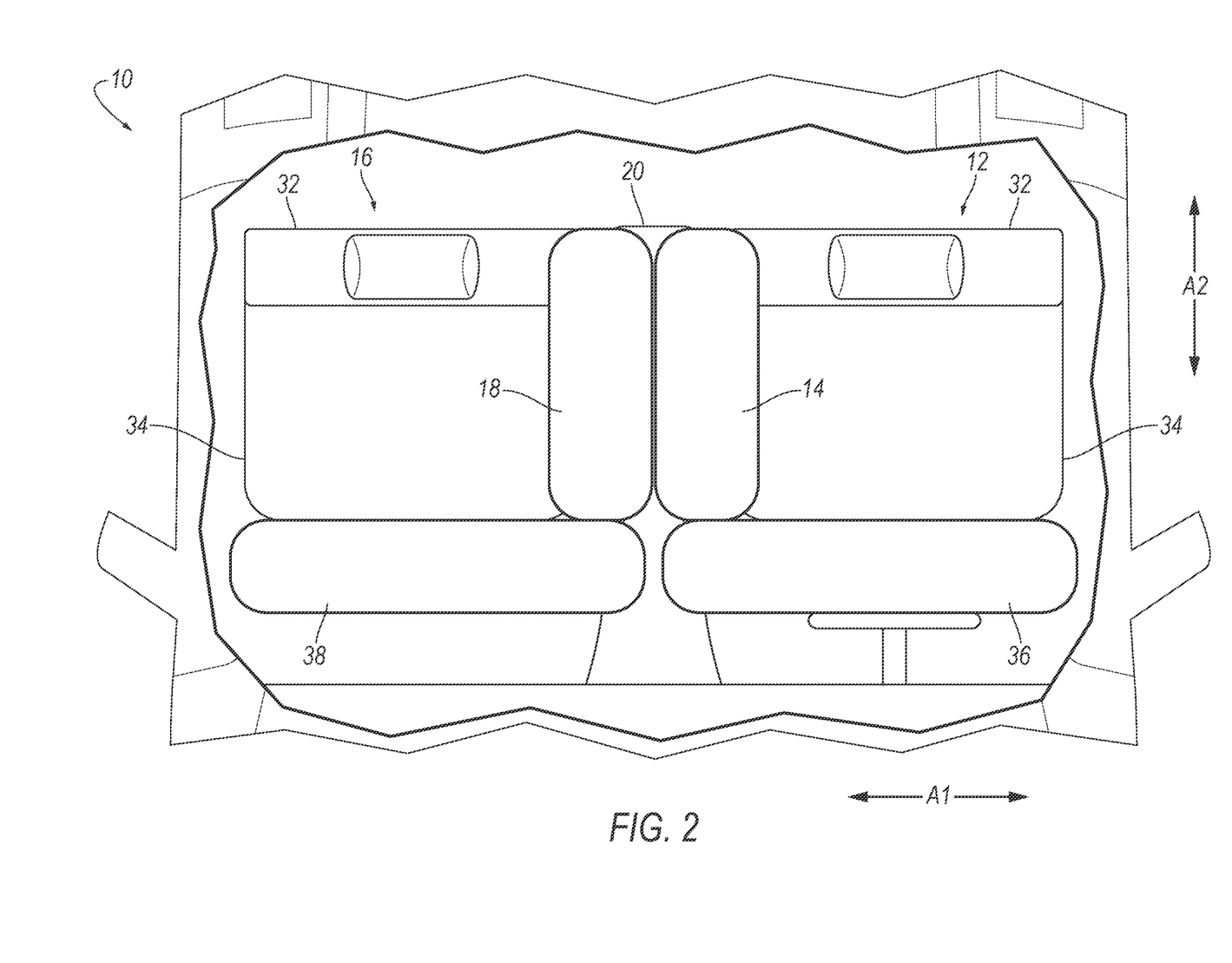
FIG. 2 is a top view of the portion of the vehicle broken away to show the passenger cabin with the airbags at inflated positions.

With reference to FIGS. 1 and 2, the vehicle 10 may be any suitable type of automobile, e.g., a passenger or commercial automobile such as a sedan, a coupe, a truck, a sport utility vehicle, a crossover vehicle, a van, a minivan, a taxi, a bus, etc.

In the present description, relative vehicular orientations and directions (by way of example, top, bottom, front, rear, outboard, inboard, inward, outward, forward, rearward, lateral, left, right, etc.) are from the perspective of an occupant seated in the vehicle 10 and facing forward, e.g., toward a forward windshield of the vehicle 10. The forward direction of the vehicle 10 is the direction of movement of the vehicle 10 when the vehicle 10 is engaged in forward drive with wheels of the vehicle 10 straight.

The vehicle 10 defines a lateral axis A1 extending between a left-side and a right-side of the vehicle 10. The vehicle 10 defines a longitudinal axis A2 extending between a front and a rear of the vehicle 10. The vehicle 10 defines a vertical axis extending between a top and a bottom of the vehicle 10. The lateral axis A1, the longitudinal axis A2, and the vertical axis are perpendicular relative to each other.

The vehicle 10 includes a frame and a body. The body may be of unitary construction, in which the frame is unitary with the body, e.g., including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc. The body defines the passenger cabin to house occupants, if any, of the vehicle 10. The passenger cabin may extend across the vehicle 10, i.e., from one side to the other side of the vehicle 10. The passenger cabin includes the front end and a rear end.

One or more seats 12, 16, e.g., the first seat 12 and the second seat 16, may be supported in the passenger cabin, e.g., by the floor of the vehicle 10. The first seat 12 may be at a first side, e.g., a driver side, of the vehicle 10. The second seat 16 may be at a second side opposite the first side, e.g., a passenger side, of the vehicle 10.

Each seat 12, 16 includes a seatback 32 and a seat bottom 34 that can support an occupant of the respective seat 12, 16. For example, the occupant of the seat 12, 16 may sit atop a top surface of the seat bottom 34 and recline against the seatback 32. The seatback 32 and the seat bottom 34 may be adjustable in multiple degrees of freedom. Specifically, the seatback 32 and the seat bottom 34 may themselves be adjustable, in other words, adjustable components within the seatback 32 and/or the seat bottom 34.

The seatback 32 can include a frame and a covering. The frame may include tubes, beams, etc. Specifically, the frame may include a pair of upright frame members. The upright frame members are elongated, and specifically, are elongated in a generally upright direction (e.g., generally along the vertical axis) when the seatback 32 is in a generally upright position. The upright frame members are spaced from each other along the lateral axis A1. The frame may include one or more cross-members extending between the upright frame members. The frame, including the upright frame members, may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The cover may include upholstery and padding. The upholstery may be cloth, leather, faux leather, or any other suitable material. The upholstery may be stitched in panels around the frame. The padding may be between the cover and the frame and may be foam or any other suitable material.

The seat bottom 34 can include a frame and a covering. The frame may include tubes, beams, etc. Specifically, the frame may include a pair of frame members, e.g., elongated along the longitudinal axis A2. The frame members are spaced from each other along the lateral axis A1. The frame may include cross-members extending between the frame members. The cross-members may be elongated along the lateral axis A1. The frame can include a seat pan. The seat pan may be generally planar and extend from one of the frame members to the other of the frame members, e.g., along the lateral axis A1. The seat pan may be fixed to the frame members. The frame, including the frame members, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the upholstery and the frame. The padding may be foam or any other suitable material. The seatback 32 is supported by the seat bottom 34 at a rear of the seat bottom 34. The seat bottom 34 extends forward from the seatback 32. The seatback 32 is movable relative to the seat bottom 34. For example, the seatback 32 may pivot about an axis that is parallel to the longitudinal axis A2.

The middle console 20 of the vehicle 10 is adjacent, i.e., next to, the first seat 12 and the second seat 16. The middle console 20 is disposed between the first seat 12 and the second seat 16, e.g., along the lateral axis A1. The middle console 20 may be on a longitudinally extending midline of the vehicle 10. The middle console 20 may be in the middle of two adjacent seats 12, 16, e.g., the first seat 12 and the second seat 16. The middle console 20 may be elongated along the longitudinal axis A2. The middle console 20 may include an armrest, cupholders, etc.

The vehicle 10 includes airbags 14, 18, 36, 38, e.g., the first airbag 14, the second airbag 18, a third airbag 36, and a fourth airbag 38, for controlling kinematics of one or more occupants of the vehicle 10 during certain impacts to the vehicle 10. Each of the airbags 14, 18, 36, 38 is inflatable from an uninflated position, shown in FIG. 1, to an inflated position, shown in FIG. 2. The airbags 14, 18, 36, 38 may each include panels of a woven polymer, or any other suitable material, that define inflation chambers that can receive inflation medium to inflate the airbags 14, 18, 36, 38 to the inflated positions. As one example, the airbags 14, 18, 36, 38 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 14 is supported by the first seat 12. The second airbag 18 is supported by the second seat 16. The first airbag 14 and the second airbag 18 may be supported by the seatbacks 32 of the seats 12, 16. The first airbag 14 and the second airbag 18 may be fixed to frames of the seatbacks 32, e.g., fixed to the pair of upright frame members via fasteners or other suitable structure. The first airbag 14 and the second airbag 18 may be supported via airbag housings, e.g., fixed to the frames of the seatbacks 32. The first airbag 14 and the second airbag 18 in the uninflated positions may be internal of the first seat 12 and the second seat 16, e.g., under the coverings of the seatbacks 32.

The first airbag 14 and the second airbag 18 in the inflated positions may generally control kinematics of an occupant along the lateral axis A1. The first airbag 14 and the second airbag 18 in the inflated positions extend forward from the seatbacks 32 of the first seat 12 and the second seat 16. For example, the first airbag 14 in the inflated position may extend from the seatback 32 of the first seat 12 along the longitudinal axis A2 between the seat bottom 34 of the first seat 12 and the middle console 20 along the lateral axis A1. The second airbag 18 in the inflated position may extend forward from the seatback 32 of the second seat 16 along the longitudinal axis A2 and between the seat bottom 34 of the second seat 16 and the middle console 20 along the lateral axis A1. The first airbag 14 and the second airbag 18 in the inflated positions may be longer along the longitudinal axis A2 than along the lateral axis A1.

The third airbag 36 and the fourth airbag 38 are supported by the middle console 20. For example, the first airbag 14 and the second airbag 18 may be fixed within the middle console 20, e.g., via fastener or other suitable structure. The third airbag 36 and the fourth airbag 38 may be supported via airbag housings, e.g., fixed to the middle console 20. The third airbag 36 and the fourth airbag 38 in the uninflated positions may be internal of the middle console 20.

The third airbag 36 and the fourth airbag 38 in the inflated positions may generally control kinematics of an occupant along the longitudinal axis A2. The third airbag 36 and the fourth airbag 38 in the inflated positions extend laterally outboard from the middle console 20 in front of the first seat 12 and the second seat 16. For example, the third airbag 36 may extend from the middle console 20 along the lateral axis A1 in front of the first seat 12. The fourth airbag 38 may extend from the middle console 20 along the lateral axis A1 in front of the second seat 16. The first airbag 14 and the second airbag 18 in the inflated positions may be longer along the lateral axis A1 than along the longitudinal axis A2.

The vehicle 10 may include additional airbags 14, 18, 36, 38 (not shown). For example, the vehicle 10 may include one or more airbags 14, 18, 36, 38 supported by other seats 12, 16, by an instrument panel of the vehicle 10, by a steering wheel of the vehicle 10, by a pillar of the body of the vehicle 10, and/or any other suitable structure of the vehicle 10.

Figure 3:
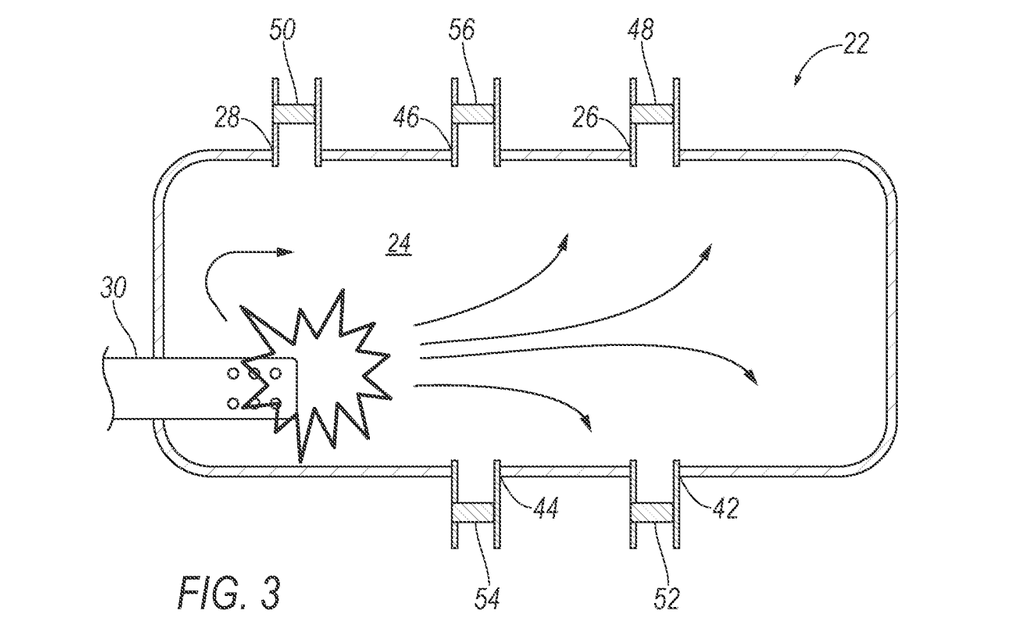
FIG. 3 is a diagrammatic view of the manifold with valves at closed positions.
Figure 4:
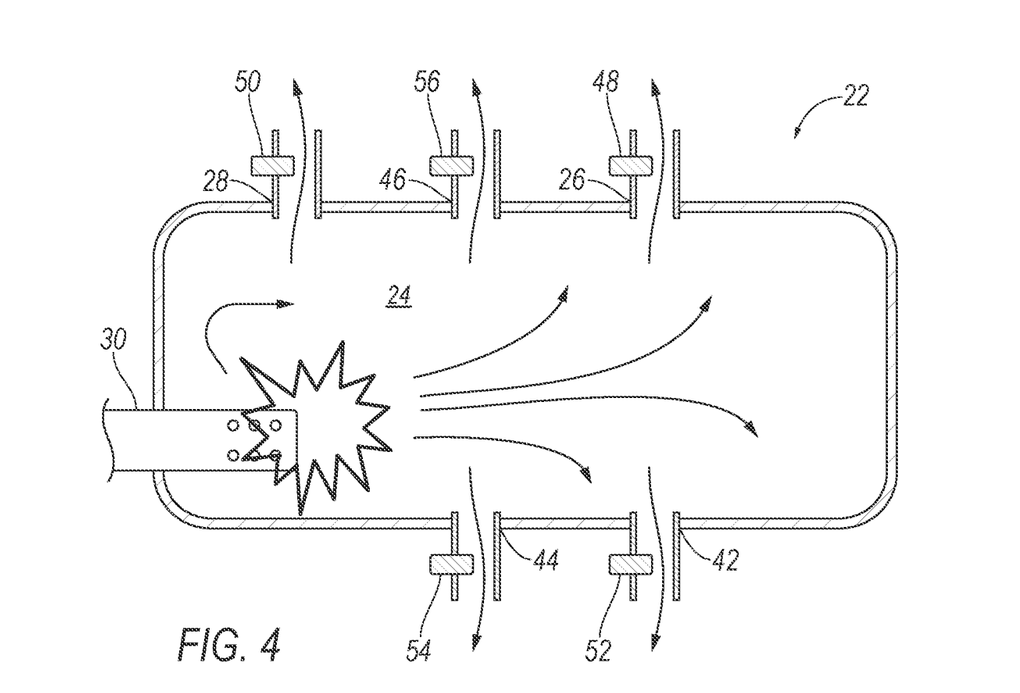
FIG. 4 is a diagrammatic view of the manifold with the valves at open positions.
Figure 5:
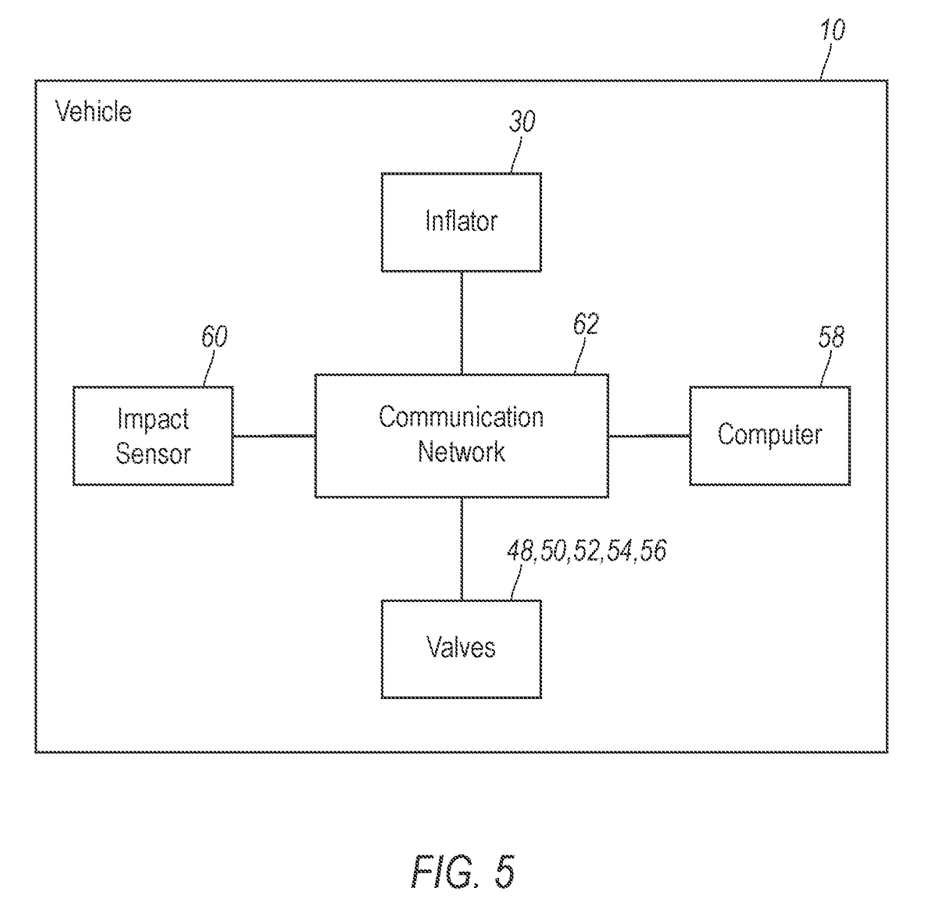
FIG. 5 is a block diagram of components of the vehicle.

The inflator 30, shown in FIGS. 3-5, provides inflation medium, e.g., to inflate the first airbag 14, the second airbag 18, the third airbag 36, and/or the fourth airbag 38 from the uninflated positions to the inflated positions. The inflator 30 may be, for example, a pyrotechnic inflator that uses a chemical reaction to drive inflation medium to the first airbag 14 and/or the second airbag 18. The inflator 30 may be of any suitable type, for example, a cold-gas inflator.

The inflator 30 is supported by the middle console 20. For example, the inflator 30 may be fixed within the middle console 20, e.g., via fastener or other suitable structure. The inflator 30 may be fixed to another component supported by the middle console 20, e.g., to the manifold 22.

The inflator 30 is operatively coupled to the manifold 22 to provide fluid to the chamber 24 of the manifold 22. For example, the inflator 30 may be fixed to the manifold 22 and provide inflation medium directly to the chamber 24. As another example, the inflator 30 may be connected to the manifold 22 via a fill tube 40 or other suitable structure that directs inflation medium from the inflator 30 to the chamber 24 of the manifold 22.

The manifold 22, shown in FIGS. 1-4, is included to receive inflation medium from the inflator 30 and to provide the inflation medium to the first airbag 14, the second airbag 18, the third airbag 36, and/or the fourth airbag 38. The manifold 22 is supported by the middle console 20. For example, the manifold 22 may be fixed within the middle console 20, e.g., via fastener or other suitable structure. The manifold 22 may be metal, a fiber laminate, or any other suitable material.

The manifold 22 defines the chamber 24 to receive and provide the inflation medium. The manifold 22 encloses the chamber 24. The chamber 24 may store inflation medium from the inflator 30 under pressure. The chamber 24 may be of sufficient volume such that generally constant pressure can be provided to the first airbag 14, the second airbag 18, the third airbag 36, and/or the fourth airbag 38. The manifold 22 may be a pressure vessel that stores a sufficient volume of fluid at sufficient pressure to fully inflate the first airbag 14, the second airbag 18, the third airbag 36, and/or the fourth airbag 38 to the inflated positions. The volume of the chamber 24 may be based on a sum of volumes of the airbags 14, 18, 36, 38 in the inflated positions and an amount of pressure that is sufficient to cause inflation of the airbags 14, 18, 36, 38 within a certain amount of time. The chamber 24 defines a cross-sectional area that is greater than a cross-sectional area defined by the first fluid outlet 26. In other words, the cross-sectional area of the first fluid outlet 26 is less than the cross-sectional area of the chamber 24. The cross-section area of the chamber 24 extends perpendicular to a flow direction of fluid through the chamber 24.

The manifold 22 includes a plurality of fluid outlets 26, 28, 42, 44, 46, e.g., the first fluid outlet 26, the second fluid outlet 28, a third fluid outlet 42, a fourth fluid outlet 44, and an exhaust fluid outlet 46, for directing fluid flow out of the chamber 24. The fluid outlets 26, 28, 42, 44, 46 provide passages that direct the flow of fluid. The fluid outlets 26, 28, 42, 44, 46 may be open to the chamber 24 on one end and open to external of the chamber 24 on an opposite end. The first fluid outlet 26 is operatively coupled to the first airbag 14 to provide fluid from the chamber 24 to the first airbag 14. The second fluid outlet 28 is operatively coupled to the second airbag 18 to provide fluid from the chamber 24 to the second airbag 18. The third fluid outlet 42 may be operatively coupled to the third airbag 36 to provide fluid from the chamber 24 to the third airbag 36. The fourth fluid outlet 44 may be operatively coupled to the fourth airbag 38 to provide fluid from the chamber 24 to the fourth airbag 38. For example, fill tube 40 may connect the first fluid outlet 26 to the first airbag 14, the second fluid outlet 28 to the second airbag 18, etc. The exhaust fluid outlet 46 enables fluid in the chamber 24 to be depressurized, e.g., the pressurized fluid may be exhausted from the chamber 24 without such fluid being directed to any airbag. For example, one end of the exhaust fluid outlet 46 may be open to the chamber 24 and an opposite end may be open to external of the chamber 24 and not operatively coupled to any airbag. The exhaust fluid outlet 46 may exhaust fluid, e.g., to the passenger cabin.

With reference to FIGS. 3-5, the vehicle 10 may include one or more valves 48, 50, 52, 54, 56, e.g., a first valve 48, a second valve 50, a third valve 52, a fourth valve 54, and an exhaust valve 56, for selectively permitting and inhibiting fluid flow through the fluid outlets 26, 28, 42, 44, 46. Each valve 48, 50, 52, 54, 56 is movable to a closed position that inhibits fluid flow, e.g., as shown in FIG. 3. Each valve 48, 50, 52, 54, 56 is movable to an open position that permits fluid flow, e.g., as shown in FIG. 4. The valves 48, 50, 52, 54, 56 may be, for example, ball valves, butterfly valves, gate valves, or other suitable structure that selectively permits and inhibits fluid flow including in some examples those that are conventionally known. The valves 48, 50, 52, 54, 56 may move from the closed position to the open position, or vice versa, in response to a command from a computer 58. Each valve 48, 50, 52, 54, 56 may include an actuator, an electromagnetic solenoid, a motor, and/or other suitable structure, including in some examples those that are conventionally known, for moving the respective valve from the closed position to the open position, or vice versa, in response to a command from the computer 58.

The first valve 48 may be connected at the first fluid outlet 26. The first valve 48 at the open position may permit fluid flow through the first fluid outlet 26 from the chamber 24 to the fill tube 40 operatively coupling the first fluid outlet 26 to the first airbag 14. The first valve 48 at the closed position may inhibit fluid flow through the first fluid outlet 26 from the chamber 24 to the fill tube 40 operatively coupling the first fluid outlet 26 to the first airbag 14.

The second valve 50 may be connected at the second fluid outlet 28. The second valve 50 at the open position may permit fluid flow through the second fluid outlet 28 from the chamber 24 to the fill tube 40 operatively coupling the second fluid outlet 28 to the second airbag 18. The second valve 50 at the closed position may inhibit fluid flow through the second fluid outlet 28 from the chamber 24 to the fill tube 40 operatively coupling the second fluid outlet 28 to the second airbag 18.

The third valve 52 may be connected at the third fluid outlet 42. The third valve 52 at the open position may permit fluid flow through the third fluid outlet 42 from the chamber 24 to the fill tube 40 operatively coupling the third fluid outlet 42 to the third airbag 36. The third valve 52 at the closed position may inhibit fluid flow through the third fluid outlet 42 from the chamber 24 to the fill tube 40 operatively coupling the third fluid outlet 42 to the third airbag 36.

The fourth valve 54 may be connected at the fourth fluid outlet 44. The fourth valve 54 at the open position may permit fluid flow through the fourth fluid outlet 44 from the chamber 24 to the fill tube 40 operatively coupling the fourth fluid outlet 44 to the fourth airbag 38. The fourth valve 54 at the closed position may inhibit fluid flow through the fourth fluid outlet 44 from the chamber 24 to the fill tube 40 operatively coupling the fourth fluid outlet 44 to the second airbag 18.

The exhaust valve 56 may be connected at the exhaust fluid outlet 46. The exhaust valve 56 at the open position may permit fluid flow out of the chamber 24 through the exhaust fluid outlet 46. The exhaust valve 56 at the closed position may inhibit fluid flow out of the chamber 24 through the exhaust fluid outlet 46.

With reference to FIG. 5, the vehicle 10 may include at least one impact sensor 60. The impact sensor 60 is configured to detect certain vehicle impacts. A "certain vehicle impact" is an impact of the type and/or magnitude for which inflation of the one or more of the airbags 14, 18, 36, 38 is designed i.e., "certain" indicates the type and/or magnitude of the impact. The type and/or magnitude of such "certain vehicle impacts" may be pre-stored in the computer 58, e.g., a restraints control module and/or a body control module. The impact sensor 60 may be configured to detect certain impact contemporaneously with the certain impact and/or the impact sensor 60 may be configured to sense certain impacts prior to impact, i.e., pre-impact sensing. The impact sensor 60 may be of any suitable type, for example, post contact sensors such as accelerometers, pressure sensors, and contact switches; and pre-impact sensors 60 such as radar, LIDAR, and vision sensing systems. The vision systems may include one or more cameras, CCD image sensors, CMOS image sensors, etc. The impact sensors 60 may be located at numerous points in or on the vehicle 10.

The vehicle 10 may include a communication network 62. The communication network 62 includes hardware, such as a communication bus, for facilitating communication among components of the vehicle 10, e.g., the inflator 30, the valves 48, 50, 52, 54, 56, the impact sensor 60, the computer 58, etc. The communication network 62 may facilitate wired or wireless communication among the components in accordance with a number of communication protocols such as controller area network (CAN), Ethernet, WiFi, Local Interconnect Network (LIN), and/or other wired or wireless mechanisms. Alternatively or additionally, in cases where the computer 58 comprises a plurality of devices, the communication network 62 may be used for communications between devices represented as the computer 58 in this disclosure.

The computer 58 may be, for example, a restraints control module of the vehicle 10. The computer 58 includes a processor, a memory, etc. The memory of the computer 58 may include memory for storing programming instructions executable by the processor as well as for electronically storing data and/or databases. The computer 58 may be a microprocessor-based computer implemented via circuits, chips, or other electronic components. For example, the computer 58 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 58 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 58. The memory can be of any type, e.g., hard disk drives, solid state drives, servers, or any volatile or non-volatile media. The memory can store the collected data sent from the sensors.

The computer 58 is programmed to, i.e., the memory stores instructions executable by the processor to, detect one or more certain impacts to the vehicle 10. The computer 58 may detect one or more certain impacts based on information received, e.g., via the communication network 62, from the impact sensors 60. The information received from the impact sensors 60 may indicate, e.g., a location of impact, angle of impact, amount of force of impact, acceleration of the vehicle 10, etc.

The computer 58 may be programmed to command actuation of the inflator 30 to provide inflation medium to the manifold 22. The computer 58 may command actuation of the inflator 30 by transmitting a command to the inflator 30, e.g., via the communication network 62. The command may include, for example, an electrical pulse that triggers expansion of the inflation medium.

The computer 58 is programmed to command one or more of the valves 48, 50, 52, 54, 56 from the closed position to the open position, and vice versa. The computer 58 may command one or more of the valves 48, 50, 52, 54, 56 to the open position or the closed position by transmitting one or more commands specifying the open position or the closed position to one or more of the valves 48, 50, 52, 54, 56. For example, the computer 58 may command the first valve 48 from the closed position to the open position by transmitting a command to the first valve 48, the command specifying the open position. As another example, the computer 58 may command the exhaust valve 56 from the open position to the closed position by transmitting a command to the exhaust valve 56, the command specifying the closed position.

The computer 58 is programmed to actuate the inflator 30 and the valves 48, 50, 52, 54, 56 to control inflation of the first airbag 14 the second airbag 18, the third airbag 36, and/or the fourth airbag 38, e.g., in response to detecting one or more certain impacts to the vehicle 10. For example, during normal operation of the vehicle 10, i.e., prior to the computer 58 detecting certain impact to the vehicle 10, the valves 48, 50, 52, 54, 56 may all be at the closed positions, e.g., as shown in FIG. 3. In response to detecting a certain impact to the vehicle 10, the computer 58 commands actuation of the inflator 30 to provide inflation medium to the manifold 22. Also in response to detecting the certain impact to the vehicle 10, the computer 58 may command at least one of the first valve 48, the second valve 50, the third valve 52, and or the fourth valve 54 from the closed position to the open position to permit inflation medium to flow from the manifold 22 to the first airbag 14 the second airbag 18, the third airbag 36, and/or the fourth airbag 38.

The computer 58 may be programmed to inflate additional of the first airbag 14 the second airbag 18, the third airbag 36, and/or the fourth airbag 38 in response to detecting another certain impact to the vehicle 10 after actuating the inflator 30. For example, in response to detecting the another certain impact to the vehicle 10, the computer 58 may command another of the first valve 48 the second valve 50, the third valve 52, and/or or the fourth valve 54 from the closed position to the open position to permit inflation medium to flow from the manifold 22 to other of the first airbag 14, the second airbag 18, the third airbag 36, and/or the fourth airbag 38 that have not been previously inflated.

Figure 6:
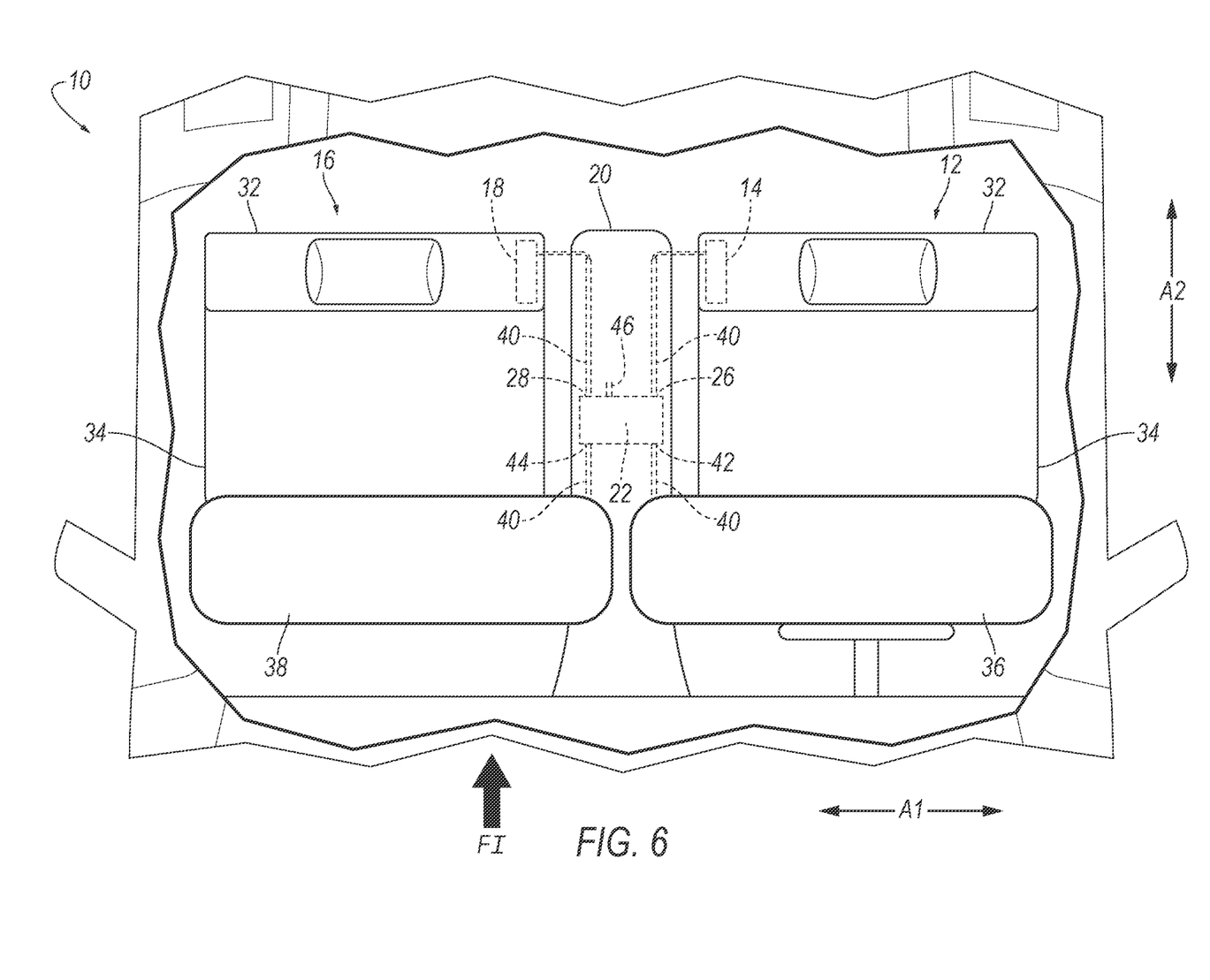
FIG. 6 is a top view of the portion of the vehicle broken away to show the passenger cabin with certain of the airbags at inflated positions.
Figure 7:
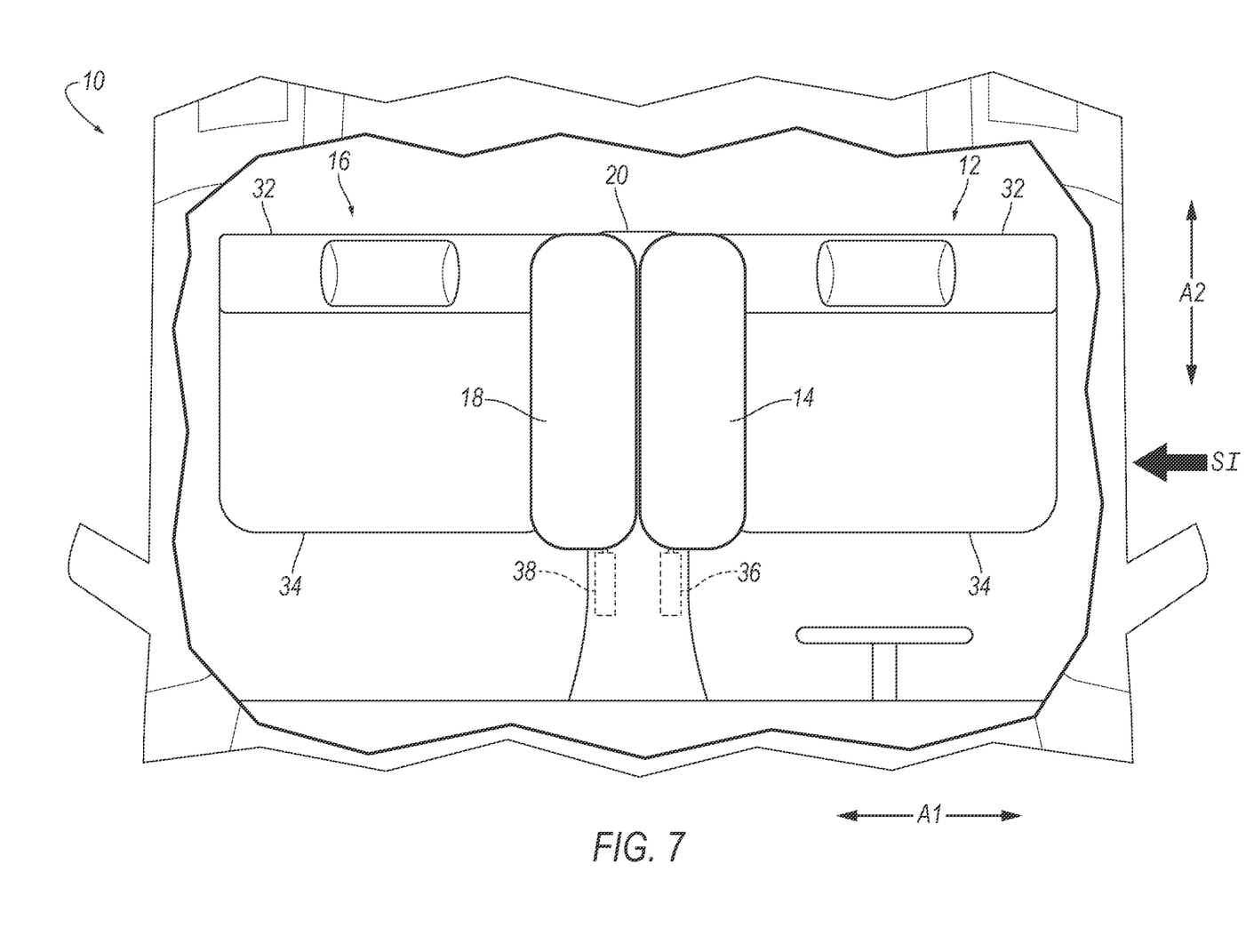
FIG. 7 is a top view of the portion of the vehicle broken away to show the passenger cabin with other certain of the airbags at inflated positions.
Figure 8:
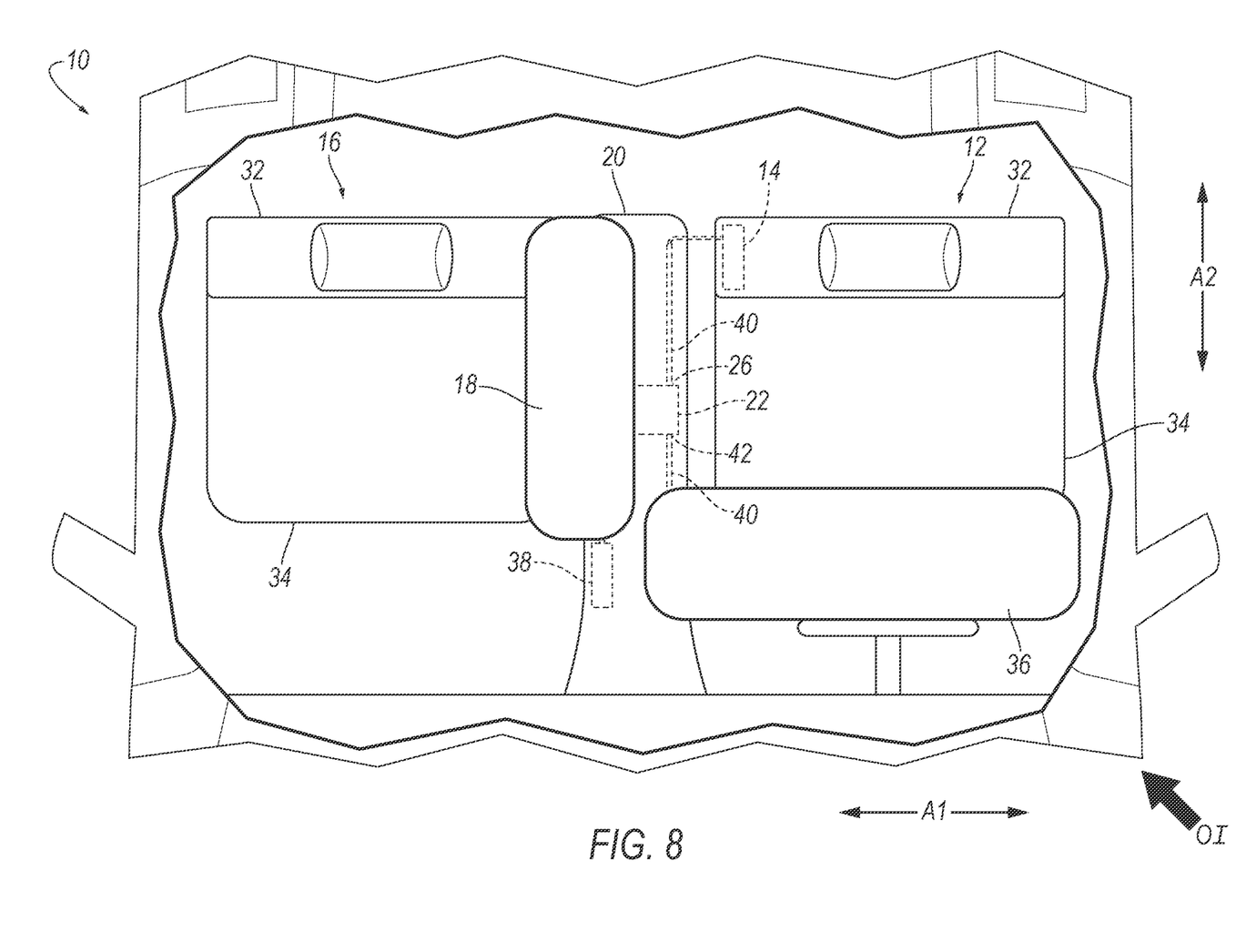
FIG. 8 is a top view of the portion of the vehicle broken away to show the passenger cabin with yet other certain of the airbags at inflated positions.

The computer 58 may select which of the first valve 48, the second valve 50, the third valve 52, and/or or the fourth valve 54 to command from the closed position to the open position based on the certain detected impact, e.g., depending on whether the certain impact is a frontal impact FI (shown in FIG. 6), a side impact SI (shown in FIG. 7), an offset impact OI to the first side (shown in FIG. 8), or an offset impact to the second side (not shown). For example, the computer 58 may store a look-up table or the like associating opening various of the valves 48, 50, 52, 54 with the different certain impacts. A sample look-up is provided below in Table 1.

TABLE 1

|  | Side Impact | Frontal Impact | Offset Impact - First Side | Offset Impact - Second Side |
| --- | --- | --- | --- | --- |
| First valve 48 | Open | na | na | Open |
| Second valve 50 | Open | na | Open | na |
| Third valve 52 | na | Open | Open | na |
| Fourth valve 54 | na | Open | na | Open |

The computer 58 may be programmed to command the first valve 48, the second valve 50, the third valve 52, and/or the fourth valve 54 from the open positions to the closed positions after a threshold amount of time has lapsed from commanding such valves 48, 50, 52, 54 from the closed position to the open position, e.g., to control a inflation pressure of the respective airbag 14, 18, 36, 38 in the inflated position. A longer amount of time between opening and then closing the valves 48, 50, 52, 54 permits more inflation medium to flow into the respective airbag 14, 18, 36, 38, thereby providing a relatively higher inflation pressure to the respective airbag 14, 18, 36, 38. A shorter amount of time between opening and then closing the valves 48, 50, 52, 54 permits less inflation medium to flow into the respective airbag 14, 18, 36, 38, thereby providing a lower inflation pressure to the respective airbag 14, 18, 36, 38. The computer 58 may determine the threshold amount of time based on a detected size of an occupant of the first seat 12 or the second seat 16, e.g., to provide a higher airbag pressure for a larger occupant and a lower airbag pressure for a smaller occupant. The threshold amount of time may be empirically determined and/or calculated, e.g., based on crash test data, computer modeling, etc. The threshold amount of time is greater than zero and may be, e.g., 20 to 60 milliseconds.

The computer 58 may be programmed to command the exhaust valve 56 from the closed position to the open position after a threshold amount of time has lapsed from detecting the certain impact, e.g., to release any remaining pressurized inflation medium from the manifold 22. The threshold amount of time may be sufficient to allow the manifold 22 to retain the pressurized inflation medium to inflate one or more additional airbags 14, 18, 36, 38 should another certain impact be detected after detection of the initial certain impact. The threshold amount of time may be, for example, at least two seconds.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The numerical adjectives "first," "second," etc., are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a first seat;
a first airbag supported by the first seat;
a second seat;
a second airbag supported by the second seat;
a middle console disposed between the first seat and the second seat;
a manifold supported by the middle console, the manifold defining a chamber and including a first fluid outlet operatively coupled to the first airbag to provide fluid from the chamber to the first airbag and a second fluid outlet operatively coupled to the second airbag to provide fluid from the chamber to the second airbag; and
an inflator supported by the middle console, the inflator operatively coupled to the manifold to provide fluid to the chamber.

2. The vehicle of claim 1, wherein the manifold includes an exhaust fluid outlet.

3. The vehicle of claim 2, further comprising an exhaust valve movable to an open position permitting fluid flow through the exhaust fluid outlet and to a closed position inhibiting fluid flow through the exhaust fluid outlet.

4. The vehicle of claim 3, further comprising a first valve movable to an open position permitting fluid flow through the first fluid outlet and to a closed position inhibiting fluid flow through the first fluid outlet, and a second valve movable to an open position permitting fluid flow through the second fluid outlet and to a closed position inhibiting fluid flow through the second fluid outlet.

5. The vehicle of claim 4, further comprising a computer having a processor and memory storing instructions executable by the processor to, in response to detecting a certain impact to the vehicle, command at least one of the first valve or the second valve from the closed position to the open position and command actuation of the inflator.

6. The vehicle of claim 5, wherein the instructions include instructions to, after a threshold amount of time has lapsed from commanding the at least one of the first valve or the second valve from the closed position to the open position, command the at least one of the first valve or the second valve from the open positions to the closed positions.

7. The vehicle of claim 6, wherein the threshold amount of time is 20 to 60 milliseconds.

8. The vehicle of claim 6, wherein the instructions include instructions to command the exhaust valve from the closed position to the open position after a second threshold amount of time has lapsed from detecting the certain impact.

9. The vehicle of claim 8, wherein the second threshold amount of time is at least two seconds.

10. The vehicle of claim 1, further comprising a third airbag supported by the middle console and a fourth airbag supported by the middle console, and wherein the manifold includes a third fluid outlet operatively coupled to the third airbag to provide fluid from the chamber to the third airbag and a fourth fluid outlet operatively coupled to the fourth airbag to provide fluid from the chamber to the fourth airbag.

11. The vehicle of claim 10, wherein the first seat and the second seat each include a seatback, wherein the first airbag and the second airbag are inflatable to inflated positions that extend forward from the seatbacks of the first seat and the second seat, and wherein the third airbag and the fourth airbag are inflatable to inflated positions that extend laterally outboard from the middle console in front of the first seat and the second seat.

12. The vehicle of claim 10, wherein the manifold includes an exhaust fluid outlet.

13. The vehicle of claim 12, further comprising an exhaust valve moveable to an open position permitting fluid flow through the exhaust fluid outlet and to a closed position inhibiting fluid flow through the exhaust fluid outlet.

14. The vehicle of claim 13, further comprising a first valve movable to an open position permitting fluid flow through the first fluid outlet and to a closed position inhibiting fluid flow through the first fluid outlet, a second valve movable to an open position permitting fluid flow through the second fluid outlet and to a closed position inhibiting fluid flow through the second fluid outlet, a third valve movable to an open position permitting fluid flow through the third fluid outlet and to a closed position inhibiting fluid flow through the third fluid outlet, and a fourth valve movable to an open position permitting fluid flow through the fourth fluid outlet and to a closed position inhibiting fluid flow through the fourth fluid outlet.

15. The vehicle of claim 14, further comprising a computer having a processor and memory storing instructions executable by the processor to, in response to detecting a certain impact to the vehicle, command at least one of the first valve, the second valve, the third valve, or the fourth valve from a closed position to an open position and command actuation of the inflator.

16. The vehicle of claim 15, wherein the instructions include instructions to, in response to detecting another certain impact to the vehicle, command another of the at least one of the first valve, the second valve, the third valve, or the fourth valve from the closed position to the open position.

17. The vehicle of claim 16, wherein instructions include instructions to command the exhaust valve from the closed position to the open position after a threshold amount of time has lapsed from detecting the certain impact.

18. The vehicle of claim 17, wherein the threshold amount of time is at least two seconds.

19. The vehicle of claim 1, wherein the chamber defines a first cross-sectional area, and the first fluid outlet defines a second cross-sectional area that is less than the first cross-sectional area.

* * * * *